H. A. PEARCE.
GEAR.
APPLICATION FILED AUG. 17, 1920.

1,412,706.

Patented Apr. 11, 1922.
2 SHEETS—SHEET 1.

Henry A. Pearce
INVENTOR

BY *Victor J. Evans*
ATTORNEY

H. A. PEARCE.
GEAR.
APPLICATION FILED AUG. 17, 1920.

1,412,706.

Patented Apr. 11, 1922.
2 SHEETS—SHEET 2.

Henry A. Pearce
INVENTOR

BY
ATTORNEY

UNITED STATES PATENT OFFICE.

HENRY ANTHONY PEARCE, OF TRAIL, BRITISH COLUMBIA, CANADA.

GEAR.

1,412,706.

Specification of Letters Patent. Patented Apr. 11, 1922.

Application filed August 17, 1920. Serial No. 404,074.

*To all whom it may concern:*

Be it known that I, HENRY A. PEARCE, a subject of the King of Great Britain, residing at Trail, British Columbia, Canada, have invented new and useful Improvements in Gears, of which the following is a specification.

This invention relates to gears and has for its primary object the construction of a gear having detachable teeth so associated that the gear as a whole is materially strengthened.

An object of the invention is to so construct the teeth and their parts that the teeth will be substantially held in place so as to withstand excessive strains but capable of being readily removed when the occasion demands.

A feature of the invention is the novel manner of constructing the ribs and slots in the teeth so that in assembling the parts the teeth will be forced toward their final position.

With these and other objects in view the invention will be better understood from the following detailed description taken in connection with the accompanying drawing wherein.

Figure 1:
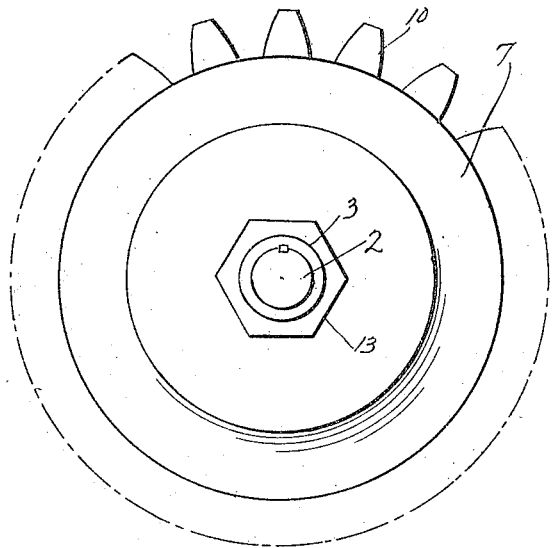
Fig. 1 is a sectional view of a gear constructed in accordance with my invention.
Figure 2:
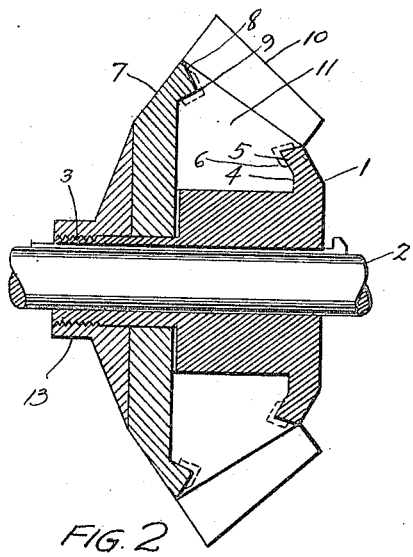
Fig. 2 is a sectional view through a portion of the gear.
Figure 3:
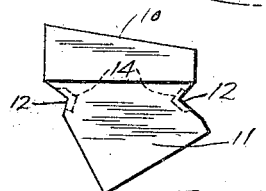
Fig. 3 is a side elevation of one of the teeth removed.
Figure 4:
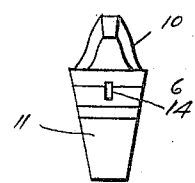
Fig. 4 is an end elevation of one of the teeth.
Figure 6:
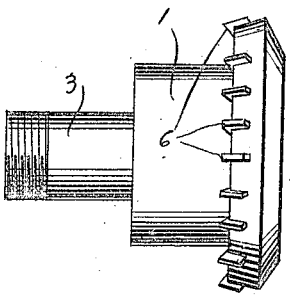
Figs. 5 and 6 are views of the disc and body.
Figure 5:
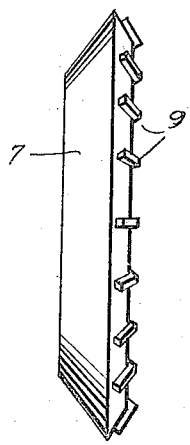
Figure 7:
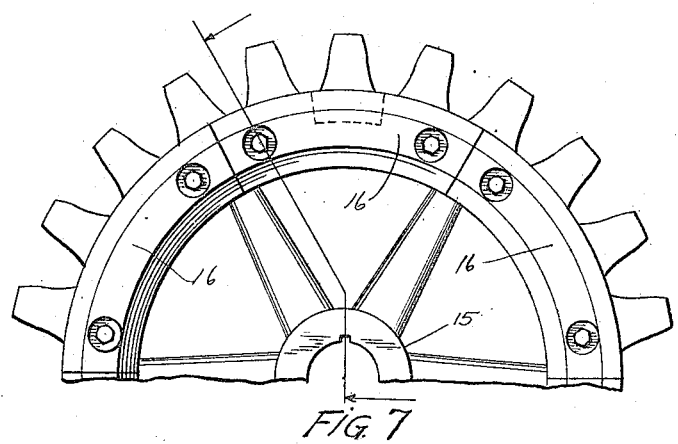
Fig. 7 is a sectional view through another form of my invention.
Figure 8:
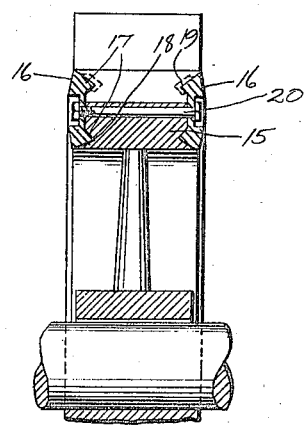
Fig. 8 is a detailed sectional view.
Figure 9:
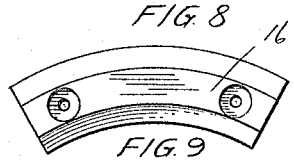
Fig. 9 is an elevation of one of the ring sections.
Figure 10:
Fig. 10 is a side elevation of the ring sections shown in Fig. 9 showing the side opposite that shown in Fig. 9.

Again referring to the drawing and more particularly to sheet 1 the numeral 1 designates the body of the gear that is directly keyed to the shaft 2. This body is provided with a threaded extension 3 and a flange 4. The flange 4 is provided with a continuous circular rib 5 wedge shape in cross section. At spaced points this rib 5 is provided with projections 6 for the purpose hereinafter described. The numeral 7 designates a disc also provided with a continuous wedge shape rib 8 that is provided at spaced intervals with projections 9. The numeral 10 designates the detachable teeth. Each tooth is provided with a body portion 11 so constructed and shaped as to completely fill the space between the flange 4 and the disc. Each tooth is provided with a pair of wedge shape slots 12 for engagement with the ribs. From this construction it will be seen that by adjusting the nut 13 the engagement between the walls of the slots and the walls of the ribs will force the teeth into their proper relations. To strengthen the connection between the teeth and the other parts of the gear each tooth is provided with a pair of recesses 14 for engagement with the heretofore mentioned projections. If found advantageous in practice a locking device may be used for holding the nut in adjusted position or a second locking nut may be used. In the second form of my invention I use a wheel shape body 15 to which is bolted a pair of rings 16. Each ring has a pair of ribs 17 one engaging a slot 18 in the wheel and the other engaging the slots 19 in the teeth. Suitably spaced bolts 20 secure the parts together.

From the foregoing description it will be seen that I provide a gear in which the teeth may be quickly renewed and which are of such a shape they may be drop forged thereby materially reducing the cost of manufacture.

A feature of my invention is the fact that a broken tooth may be readily replaced with very little effort. There are various other advantages in constructing a gear in accordance with my invention and besides the gear may be constructed in various other manners than illustrated and, therefore, I do not desire to be limited in any manner except as set forth in the claims hereunto appended.

Having thus described my invention what I claim is:

1. In a gear, a body, individual teeth having bodies provided with slots extending thereinto from their side edges and with recesses extending into the bodies from the inner sides of said slots, the edges of said recesses being disposed at obtuse angles to each other, and wedge shaped projections carried by said body for clamping engagement in said slots.

2. In a gear, a gear body, individual teeth having bodies provided with slots extending thereinto from their side edges and with recesses extending into the bodies from the inner edges of said slots, wedge shaped projections carried by said gear body for clamping engagement in said slots, and projections on said wedge shaped projections for engagement in said recesses.

3. A gear comprising a body having a wedge shaped rib, and adjustable disc having a wedge shape rib, and individual teeth constructed to be engaged by said ribs thereby clamping the teeth in place, each of said ribs being provided with a plurality of projections engaging in recesses in the teeth.

In testimony whereof I affix my signature.

HENRY ANTHONY PEARCE.